Patented May 10, 1949

2,469,788

UNITED STATES PATENT OFFICE 2,469,788

POLYMERIZATION PRODUCTS AND PROCESS OF MAKING SAME

John B. Rust, West Orange, N. J., assignor to Montclair Research Corporation, a corporation of New Jersey No Drawing. Application June 5, 1944, Serial No. 538,886

8 Claims. (Cl. 260—66)

This invention relates to mixed polymers or interpolymers and particularly to high molecular weight polymers containing both an isoolefin and an unsaturated ketone.

It is known that isobutylene can be polymerized to bodies of high molecular weight at low temperatures of the order of —40° C. to —100° C. For such processes catalysts are used, for example, the active halide catalysts such as boron trifluoride and aluminum chloride; sulfuric acid and active clay catalysts are also applicable. The production of such polyisobutylene leads to products of limited properties.

Among the objects of the present invention is the production of high molecular weight polymers containing an isoolefin and an unsaturated ketone to produce products of controlled characteristics.

Other and further objects of the present invention will appear from the more detailed description set forth below, it being understood that this more detailed description is given by way of illustration and explanation only, and not by way of limitation, since various changes therein may be made by those skilled in the art without departing from the scope and spirit of the present invention.

In accordance with the present invention, a mixed polymer is produced from an isoolefin and an unsaturated ketone. It has been found that mixed polymers of this type can be produced by polymerization of mixtures of the desired constituents at low temperatures in the presence of a polymerization catalyst, specifically a Friedel-Crafts catalyst.

As the isoolefin, any isoolefin can be employed which is capable of giving high molecular weight polymers. As the polymerizable olefin employed, the mono-isoolefins are particularly emphasized. Such isoolefins may be illustrated by the formula

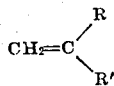

in which R and R' are alkyl groups and not hydrogen. Illustrating these, there may be mentioned isobutylene, isoamylene, isohexylene, and the like. Because of its availability, isobutylene will be utilized to illustrate the isoolefin constituent of the polymerization mixture.

The unsaturated ketone employed may be represented desirably by the general formula

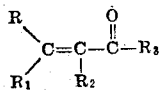

wherein R, R1 and R2 denote hydrogen or aliphatic or carbocyclic groups including, for example, alkyl, alkynyl, olefinyl, aryl, alkaryl, aralkyl, and the like, and R3 is aliphatic or carbocyclic including for example, alkyl, alkynyl, olefinyl, aryl, aralkyl, and alkaryl groups. Illustrating the unsaturated ketones that may be employed in accordance with the present invention there may be used isopropenyl methyl ketone, alpha-methylene-n-amyl methyl ketone, alpha-methylene isobutyl methyl ketone, ethyl isopropenyl ketone, methyl vinyl ketone, vinyl phenyl ketone, mesityl oxide, phorone, isophorone, benzalacetone, furfurylidine acetone, n-propenyl methyl ketone, and the like. Desirably the total number of carbon atoms in the ketone should not exceed twelve.

By adjustment of the ratio of isoolefin to unsaturated ketone in the reaction mixture, the properties of the resulting polymer or interpolymer may be controlled but the properties of the resulting polymerization product also depend on the conditions of polymerization and the ultimate molecular weight of the polymer can be controlled both by the lowness of the temperature and to some extent by the catalyst used or its concentration.

The temperature employed is desirably below 0° C. and preferably between —40° C. and —100° C. with temperatures below about —50° C. and preferably below —60° C. most desirable.

Various polymerization catalysts may be employed, such as boron trifluoride, aluminum chloride, etc., the Friedel-Crafts catalysts being desirably employed. Such Friedel-Crafts reagents may be used in the form of a complex such as those formed with ethers, esters, acids, inorganic salts and the like. Any excess of catalysts present in the polymerization product may be removed by dissolving the reaction product, if made in the absence of diluents, with benzene, low boiling petroleum hydrocarbons, etc., and precipitating the reaction product with either alcohol or acetone or other non-solvent for the polymerization product, followed by a water wash.

Inert diluents may be present, the preferred diluents being low boiling petroleum hydrocarbons, particularly those which are gaseous at room temperature but liquid at the low temperature at which polymerization is carried out illustrated for example by propane.

In practicing the invention, the isoolefin such as isobutylene (boiling point —6° C.) and the unsaturated ketone such as isopropenyl methyl ketone (boiling point 98° C.) are mixed at a temperature below about —50° C., and preferably below —60° C. The mixed liquid substances are then treated with a catalyst, for example, boron trifluoride, which is led into the solution beneath the surface thereof. The polymerization occurs rapidly to produce the desired polymer. The presence of sulfur compounds or hydrogen sulfide which act as poisoning agents is to be avoided.

The following examples illustrate the invention, the parts being by weight.

Example 1.—A mixture of 0.5 part of isopropenyl methyl ketone and 6 parts of isobutylene was made and cooled in a Dry Ice acetone bath to less than −60° C. Boron trifluoride was then led into the solution beneath the surface while stirring rapidly. The polymerization reaction occurred rapidly to yield a rubbery polymer which is a whitish gummy mass soluble in benzene, heptane, and so forth, but insoluble in alcohol, acetone, and so forth.

Example 2.—A mixture of 1 part of isopropenyl methyl ketone and 10 parts of isobutylene was made and cooled in a Dry Ice acetone bath to less than −60° C. Boron trifluoride was then led into the solution beneath the surface while stirring rapidly. The polymerization reaction occurred rapidly to yield a rubbery polymer possessing somewhat more elasticity than the polymer obtained in Example 1.

Example 3.—A mixture of 1.5 parts of isopropenyl methyl ketone and 11.5 parts of isobutylene was made and cooled in a Dry Ice acetone bath to less than −60° C. Boron trifluoride was then led into the solution beneath the surface while stirring rapidly. The polymerization reaction occurred rapidly to yield a rubbery polymer possessing good elastic properties.

Example 4.—A mixture of 2 parts of isopropenyl methyl ketone and 10 parts isobutylene was made and cooled in a Dry Ice acetone bath to less than −60° C. Boron trifluoride was then led into the solution beneath the surface while stirring rapidly. The polymerization reaction occurred rapidly to yield a rubbery polymer possessing somewhat more plasticity than the polymer obtained in Example 3.

Example 5.—A mixture of 0.7 part of isopropenyl methyl ketone and 9 parts of isobutylene was made and cooled in a Dry Ice acetone bath to less than −60° C. Boron trifluoride was then led into the solution beneath the surface while stirring rapidly. The polymerization reaction occurred rapidly to yield a rubbery polymer possessing good elastic properties.

Example 6.—The procedure outlined in the above example was followed in interpolymerizing other ketones. Results obtained are tabulated below.

Table

| Number | Unsaturated Ketone used | Parts used | Isobutylene Parts used | Description of polymers |
|---|---|---|---|---|
| 1 | Methylene-n-amyl methyl ketone | 1 | 10 | Tacky rubbery mass, could be pulled into a thin, very extensible sheet. |
| 2 | ...do... | 2 | 10 | Like 1, but more tacky. Sheet weaker. |
| 3 | ...do... | 5 | 10 | Rubbery mass, too tacky to be pulled into sheet. |
| 4 | Methylene isobutyl methyl ketone | 1 | 10 | Like 1, but more tacky. |
| 5 | ...do... | 2 | 10 | Like 1, but more tacky and shorter. |
| 6 | Mesityl oxide | 1 | 10 | Like 1, slightly shorter. |
| 7 | ...do... | 2 | 10 | Do. |
| 8 | None | | 10 | Viscous tacky mass. |
| 9 | Isopropenyl ethyl ketone | 1 | 10 | Almost identical to 1. |
| 10 | ...do... | 2 | 10 | Do. |

These examples illustrate how the unsaturated ketone may be utilized to control the properties of the ultimate polymerization product, particularly from the standpoint of tackiness, extensibility, elasticity, and solubility.

Having thus set forth my invention, I claim:

1. A high molecular weight extensible polymerization product of substantial amounts of both a polymerizable isoolefin and an unsaturated ketone.

2. A high molecular weight extensible polymerization product of substantial amounts of both isobutylene and isopropenyl methyl ketone resulting from the method of claim 1.

3. The method of producing polymerization products which comprises polymerizing at a temperature of from 0° to −100° C. in the presence of a Friedel-Crafts catalyst a mixture of substantial amounts of both a polymerizable isoolefin selected from the group consisting of isobutylene, isoamylene, and isohexylene and an unsaturated ketone selected from the group consisting of isopropenyl methyl ketone, alpha-methylene-n-amyl methyl ketone, alpha-methylene isobutyl methyl ketone, ethyl isopropenyl ketone, methyl vinyl ketone, vinyl phenyl ketone, mesityl oxide, phorone, isophorone, benzalacetone, furfurylidine acetone, n-propenyl methyl ketone, the ratio of isoolefin to ketone being from 10:1 to 10:5 by weight.

4. The method of producing polymerization products as set forth in claim 3 in which the isoolefin is isobutylene.

5. The polymerization product resulting from the method of claim 4.

6. The method of producing polymerization products as set forth in claim 3 in which the isoolefine is isobutylene, the ketone is isopropenyl methyl ketone, and the temperature is from −40° to −100° C.

7. The method of producing polymerization products which comprises polymerizing a mixture of substantial amounts of both isobutylene and isopropenyl methyl ketone in the presence of boron trifluoride as a polymerization catalyst at a temperature from about −40° C. to −100° C. the ratio of isobutylene to isopropenyl methyl ketone being from 10:1 to 10:5 by weight.

8. The method of producing polymerization products as set forth in claim 3 in which the catalyst is boron trifluoride and the temperature is from −40° to −100° C.

JOHN B. RUST.

REFERENCES CITED

The following references are of record in the file of this patent:

UNITED STATES PATENTS

| Number | Name | Date |
|---|---|---|
| 2,055,456 | Eichwald | Sept. 22, 1936 |
| 2,158,290 | Lange | May 16, 1939 |
| 2,213,423 | Gaylor | Sept. 3, 1940 |

FOREIGN PATENTS

| Number | Country | Date |
|---|---|---|
| 803,563 | France | July 15, 1936 |

Certificate of Correction

Patent No. 2,469,788. May 10, 1949.

JOHN B. RUST

It is hereby certified that errors appear in the printed specification of the above numbered patent requiring correction as follows:

Column 3, line 74, claim 1, after the word "ketone" and before the period, insert *resulting from the method of claim 3*; column 4, line 3, claim 2, for the claim reference numeral "1" read 7;

and that the said Letters Patent should be read with these corrections therein that the same may conform to the record of the case in the Patent Office.

Signed and sealed this 18th day of October, A. D. 1949.

[SEAL]

THOMAS F. MURPHY,
*Assistant Commissioner of Patents.*